(12) United States Patent
Blinnikka et al.

(10) Patent No.: US 8,825,625 B2
(45) Date of Patent: Sep. 2, 2014

(54) METHOD AND SYSTEM FOR IMPROVED CATEGORICAL SEARCHING

(75) Inventors: Tomi Blinnikka, Berkeley, CA (US); Steven Horowitz, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 211 days.

(21) Appl. No.: 11/670,317

(22) Filed: Feb. 1, 2007

(65) Prior Publication Data

US 2008/0189247 A1 Aug. 7, 2008

(51) Int. Cl.
*G06F 17/30* (2006.01)
(52) U.S. Cl.
CPC .............................. *G06F 17/30864* (2013.01)
USPC ........... 707/708; 707/771; 707/899; 715/810; 715/840
(58) Field of Classification Search
None
See application file for complete search history.

(56) References Cited

U.S. PATENT DOCUMENTS

| | | | |
|---|---|---|---|
| 6,708,162 B1* | 3/2004 | Morgan et al. | 1/1 |
| 2002/0078045 A1* | 6/2002 | Dutta | 707/7 |
| 2003/0041060 A1* | 2/2003 | Lester et al. | 707/7 |
| 2003/0120779 A1* | 6/2003 | Rodefer et al. | 709/225 |
| 2003/0140120 A1* | 7/2003 | Hartman | 709/219 |
| 2005/0097089 A1* | 5/2005 | Nielsen et al. | 707/3 |
| 2005/0149576 A1* | 7/2005 | Marmaros et al. | 707/200 |
| 2006/0080303 A1* | 4/2006 | Sargent et al. | 707/3 |
| 2006/0265344 A1* | 11/2006 | Woods | 707/1 |
| 2007/0070066 A1* | 3/2007 | Bakhash | 345/419 |
| 2007/0157118 A1* | 7/2007 | Wuttke | 715/810 |

OTHER PUBLICATIONS

Author:Nancy Blachman; Title:Google Guide; Date: Aug. 23, 2005; Publisher: Creative Commons; Pertinent pp. 1-149 (as re-numbered in attached pdf).*
Author: Britannica Online Encyclopedia; Title: category; Date: year 2011; Publisher: Britannica.com; Pertinent pp. 2 pages.*
Author: Paul Bausch, title: Yahoo! Hacks, Dated:Oct. 17, 2005, Publisher: O'Reilly Media, Inc., Pertinent pp. 1-17 (as re-numbered in attached pdf file).*
Author: Google; Title: "About Google Toolbar Features"; Date: Dec. 24, 2005 (retrieved via Internet archive wayback machine); Publisher: Google (via http://toolbar.google.com/button_help.html); Pertinent pp. 1-5 (as attached in pdf file).*
Answer. Product Support. [online]. Logitech, 2006. [retrieved on Oct. 4, 2006]. Retrieved from the Internet: <http://logitech-en-amr.custhelp.com/cgi-bin/logitech en amr.cfg/php/enduser/std adp.php?p faqid=5292&p created=1156445 . . . >.
Docktop. [online]. Jonathan Nathan, 2006. [retrieved on Oct. 4, 2006]. Retrieved from the Internet: <http://homepage.mac.com/jonn8/docktop/>.
UInterface—MouseLaunch : Quickest Program Launcher [online]. UInterface, 2006 [retrieved on Oct. 4, 2006]. Retrieved from the Internet: <http://www.uinterface.com/mouselaunch/>.

* cited by examiner

*Primary Examiner* — Anh Tai Tran
(74) *Attorney, Agent, or Firm* — James J. DeCarlo; Greenberg Traurig, LLP (57) ABSTRACT

Systems and methods have been developed for searching an index by category. More specifically, systems and methods have been developed for launching a search program that sends to a browser a search address associated with a selected search category for transmission to a remote computing device.

42 Claims, 7 Drawing Sheets

METHOD AND SYSTEM FOR IMPROVED CATEGORICAL SEARCHING

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

As the Internet grows both in complexity and popularity, the need for effective systems, interfaces and methods for navigating and searching the Internet has increased. As a result of the Internet's growth, search engines such as Yahoo! and Google commonly return hundreds of pages of results for a single keyword search. Thus, it is becoming increasingly difficult for users of the search engines to navigate and find the information they are searching for within the very large number of search results.

In response, many search engines and other search utilities now provide keyword searches by category. For example, as set forth on Yahoo!'s home page, a user may select a search category (e.g., "Images", "Video", "Audio", etc.) to narrow the results set of a search and more easily find the information he or she is looking for. Thus, if a sophisticated searcher selects the "Video" search category, he or she may obtain search results that include videos but exclude images and audio.

Although categorized searching helps narrow search results, many search engine users do not utilize selecting a search category for keyword searches. One reason for this is that many search engines restrict category selection to a single part (e.g., the top or bottom) of what may be a very long web page. Even sophisticated search users may find navigation to the category selection part of a web page time-consuming or distracting. Another reason that search engine users do not utilize categories for keyword searches is due to many search engines restricting category selection to parent or top-level web pages. Thus, a search engine user who navigates away from the parent or top-level web page may find it impossible to search by category. As a result, these users may be frustrated by the shear volume of results generated by simple keyword searches and they may blame their frustration on the quality of the search engine or search engine provider.

SUMMARY

Against this backdrop systems and methods have been developed for searching an index by category. More specifically, systems and methods have been developed for launching a search program that sends to a browser a search address associated with a selected search category for transmission to a remote computing device.

In one example (which example is intended to be illustrative and not restrictive), the present invention may be considered a method for searching in a networked computing environment. The method includes launching a search program associated with a search utility on a remote computing device, the search program including at least one search category selection control associated with a search address. The method further includes receiving a user selection of the at least one search category selection control and launching, by the search program, a browser program. Lastly, the method includes transmitting the search address to the browser program.

In another example (which example is intended to be illustrative and not restrictive), the present invention may be considered a system for searching an index. The system includes a search program adapted to permit selection of at least one search category parameter, the search program including instructions for generating and sending a search module request to a browser program. The system also includes a browser program including instructions for receiving the search module request from the search program and transmitting a remote search module request. The system further includes a searchable index of entries, the entries including information that corresponds to the at least one search category parameter. Lastly, the system includes a search module on a remote computing device adapted to search, in response to receiving the remote search module request, for entries matching the at least one search category parameter.

In yet another example (which example is intended to be illustrative and not restrictive), the present invention may be considered a graphical user interface generated by a client for display to a user via a rendering device. The graphical user interface includes an application window that comprises a search term input field and one or more search category selection controls.

In one example (which example is intended to be illustrative and not restrictive), the present invention may be considered a computer readable medium encoding or containing computer executable instructions for performing a method for searching in a networked computing environment. The method includes launching a search program associated with a search utility on a remote computing device, the search program including at least one search category selection control associated with a search address. The method further includes receiving a user selection of the at least one search category selection control. The method includes launching, by the search program, a browser program. The method further includes transmitting the search address to the browser program.

In another example (which example is intended to be illustrative and not restrictive), the present invention may be considered a method for searching in a networked computing environment. The method includes launching a first program associated with a search utility on a remote computing device, the first program including at least one search category selection control associated with a search request. The method further includes receiving a user selection of the at least one search category selection control. The method includes launching, by the first program, a second program. The method further includes transmitting the search request to the second program.

In one example (which example is intended to be illustrative and not restrictive), the present invention may be considered a computer readable medium encoding or containing computer executable instructions for performing a method for searching in a networked computing environment. The method includes launching a first program associated with a search utility on a remote computing device, the first program including at least one search category selection control associated with a search request. The method further includes receiving a user selection of the at least one search category selection control. The method includes launching, by the first program, a second program. The method further includes transmitting the search request to the second program.

In another example (which example is intended to be illustrative and not restrictive), the present invention may be considered a method for searching in a networked computing environment. The method includes launching a first program associated with a search utility on a remote computing device, the first program including at least one search category selection control associated with a search request. The method further includes receiving a user selection of the at least one search category selection control to generate the search request. The method includes transmitting the search request to the search utility. The method further includes receiving, by the first program, at least one search result corresponding to the search request. The method includes selecting the at least one search result. The method further includes launching, by the first program, a second program to render the selected at least one search result.

In one example (which example is intended to be illustrative and not restrictive), the present invention may be considered a computer readable medium encoding or containing computer executable instructions for performing a method for searching in a networked computing environment. The method includes launching a first program associated with a search utility on a remote computing device, the first program including at least one search category selection control associated with a search request. The method further includes receiving a user selection of the at least one search category selection control to generate the search request. The method includes transmitting the search request to the search utility. The method further includes receiving, by the first program, at least one search result corresponding to the search request. The method includes selecting the at least one search result. The method further includes launching, by the first program, a second program to render the selected at least one search result.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
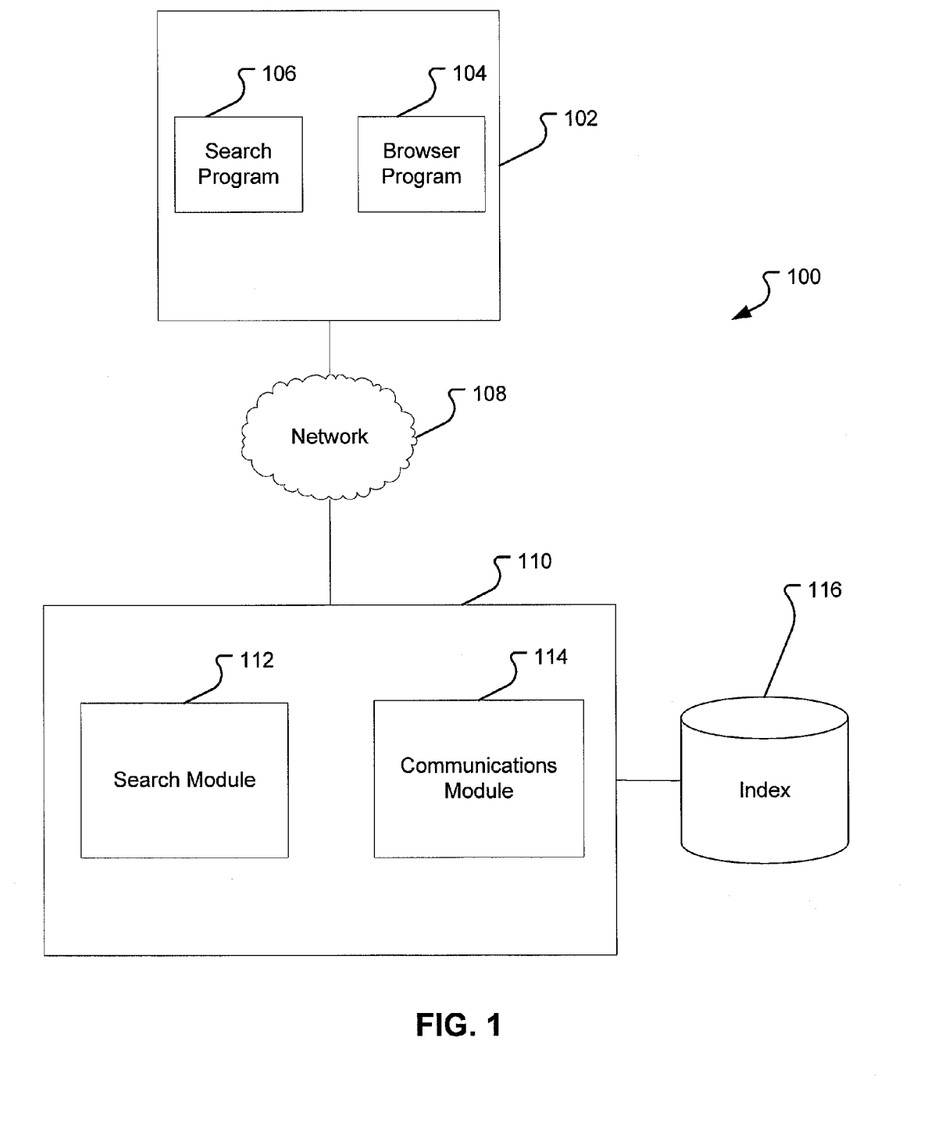
FIG. 1 illustrates an embodiment of a computing architecture that includes a system for searching an index by category.

FIG. 1 illustrates an embodiment of a computing architecture that includes a system 100 for searching an index by category. In one embodiment, a computing device 102 launches a search program 106. A computing device 102 may be one or more devices capable of processing information to produce a desired result (e.g., a computer). For example, a computing device 102 may be a personal computer such as a IBM PC or Apple Macintosh. As another example, a computing device 102 may be a mobile computing device such as a personal digital assistant (e.g., a Treo), mobile phone or portable media player (e.g., an iPod). A computing device 102 may include various types of inputs, including but not limited to, a keyboard and/or mouse. A computing device 102 may also include many types of outputs. In one embodiment, a computing device 102 is comprised of or is connected to one or more image-rendering devices (e.g., a television, monitor, or LCD). In one embodiment, a computing device 102 is connected to a network 108. A network 108 may be comprised of one or more computing devices and/or associated devices that may be inter-connected to exchange information. For example, a network 108 may include a variety of connection methods and transmission protocols, including but not limited to, wired, wireless, and hybrid networks. In another embodiment, a network 108 may include cabling or other associated devices.

In one embodiment, a computing device 102 includes a search program 106. In one embodiment, a search program 106 comprises one or more search category selection controls that are associated with search categories on a remote computing device 110. For example, a search program 106 may include "News" and "Sports" category selection controls that, respectively, correspond to "News" and "Sports" category identifiers of database records on a remote computing device 110. In one embodiment, a search program 106 comprises one or more search category selection controls that are associated with a search address. In one embodiment, a search address is a URL. For example, a search category selection control may be associated with a search address that may be used by a browser program 104 to search for one or more records on an index 116 that correspond to the category associated with the category selection control. In another embodiment, a search address may be a portion of a URL. In another embodiment, as discussed below, a search address may incorporate one or more terms from a search term input field. One skilled in the art will recognize that a search address may take many forms, including but not limited to a memory or hardware address of a computing device or component. In one embodiment, a search program 106 is comprised of a sequence of computer-executable instructions and data that display and permit interaction with a graphical user interface. In one embodiment, the graphical user interface of a search program 106 permits selection of at least one search category selection control that is associated with a search. In one embodiment, the search address that is associated with the search category selection control of a search program 106 may be a uniform resource locator (URL). In another embodiment, the search address that is associated with the search category selection control of a search program 106 may be, but is not limited to, a memory address, a register address, a network address (e.g., a source or destination address of an IP packet), or some other network address or signal.

In the embodiment shown, a system 100 also includes a browser program 104. In one embodiment, browser program is a software application (e.g., Microsoft Internet Explorer, Mozilla Firefox, Opera, Netscape Explorer or Apple Safari) and that enables a user to render a display and interact with text, images, and other information typically located on a web page at a website on the Internet or a local area network. In one embodiment, a browser program 104 is comprised of instructions and data residing on a computing device 102. In another embodiment, a browser program 104 may be comprised of one or more instructions and/or data that may reside on another computing device or a network 108. In one embodiment, a browser program 104 is operable to transmit information to and/or from a search program 106 and a remote computing device 110 via a network 108. One skilled in the art will recognize that a browser program 104 may take many forms, and may rely upon one or more other programs that may reside at local and/or remote locations.

In the embodiment shown, a system 100 also includes a remote computing device 110. In one embodiment, a remote computing device 110 is comprised of one or more computing devices that are connected and that share information. One skilled in the art will recognize that a remote computing device 110 may take many forms and may be comprised of a variety of hardware and/or software elements. In one embodiment, a remote computing device 110 is connected to an index 116. In one embodiment, an index 116 may be comprised of one or more databases that reside on one or more storage devices (e.g., a hard drive) or memory. For example, an index 116 may be comprised of different types of databases including, but not limited to, relational databases such as structured query language (SQL) databases. One skilled in the art will recognize that databases may take many forms, including but not limited to a collection of records that are stored in some order. One skilled in the art will also recognize that database records may take many forms, including but not limited to data structures and other collections of information and/or elements. In one embodiment, an index 116 comprises one or more records that are searchable and that contain information or parameters that correspond to a search category. For example, an index 116 may be comprised of records that are identified as belonging to one or more categories such as "News," "Shopping" or "Sports." In another embodiment, an index 116 may be comprised of records that are identified as belonging to one or more parent and child categories. For example, a record may belong to the "News" and "Sports" parent categories, while also belonging to a "Football" child category of the "Sports" parent category. One skilled in the art will further recognize that categories may be indicated by various indicia, including but not limited to names (e.g., "News"), numbers or various other symbols and/or identifiers.

In one embodiment, a remote computing device 110 includes a search module 112 and a communications module 114. In one embodiment, a search module 112 is adapted to receive search requests from a communications module 114. In one embodiment, a communications module 114 may be comprised of one or more communications interfaces that permit communications between hardware and/or software and a computing device 102, a network 108, and a remote computing device 110. In one embodiment, a search module 112 is adapted to search for records in an index 116 that may match one or more categories identified by a search request. For example, a search module 112 may be comprised of one or more computer processes running on a remote computing device 110 that may use a search algorithm (e.g., binary search or interpolation search). One skilled in the art will recognize that a search module 112 may be implemented in many forms and configurations that are within the scope of this disclosure.

Figure 2:
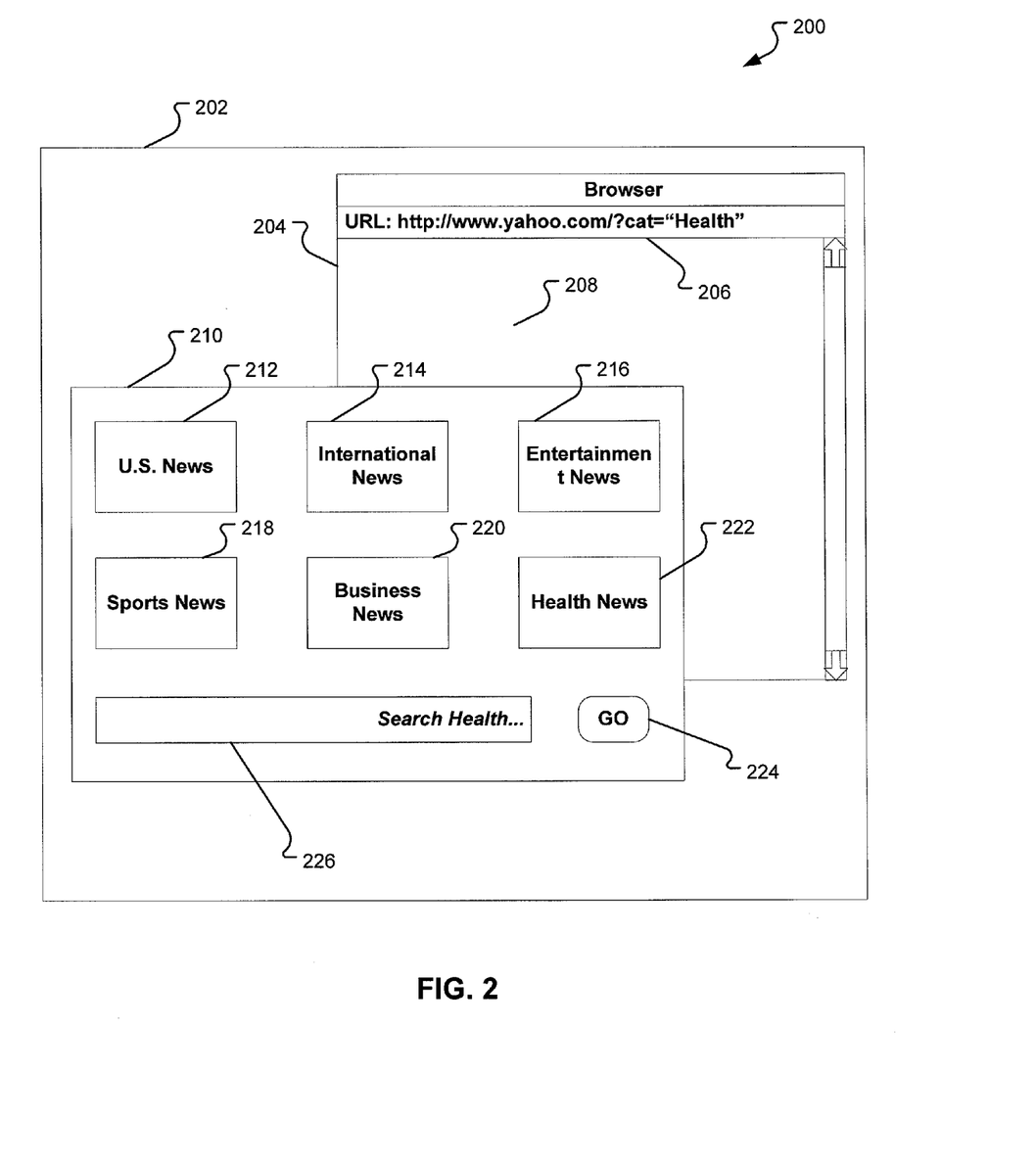
FIG. 2 illustrates an embodiment of a graphical user interface for searching in a networked computing environment.

FIG. 2 illustrates an embodiment of a graphical user interface (GUI) 200 for searching in a networked computing environment. In one embodiment, a GUI 200 is comprised of one or more desktop 202 display environments. A desktop 202 may be comprised of many graphical user interfaces, including but not limited to icons, buttons, windows, toolbars, folders, wallpaper, images, and text. A desktop 202 may also be comprised of a window manager, file manager, as well as various themes, programs and libraries for managing the desktop. One skilled in the art will recognize that a desktop 202 may take many forms, including but not limited to the desktop display environments associated with the Microsoft Windows (e.g., Windows XP and Windows Vista) and Mac OS X operating systems.

In one embodiment, a search program application window 210 is displayed within a desktop 202 rendered by a computing device 102. One skilled in the art will recognize that various methods exist for displaying a search program application window 210, including but not limited to launching or executing a sequence of instructions associated with a search program 106. In one embodiment, a search program window 210 receives user inputs and, based on these inputs, a browser program is executed and instructed to perform a corresponding search.

In one embodiment, a search program application window 210 is comprised of a search term input field 226, one or more selectable search category selection controls 212, 214, 216, 218, 220, 222, and a selectable search request control 224.

In the embodiment shown, a search term input field 226 is comprised of a text box for input of search terms by a user using an input device such as a keyboard. One skilled in the art will recognize that search terms may be entered into a search term input field 226 using many types of input devices, including but not limited to keyboards, touch-screens (e.g., a touch-screen may permit access to a keyboard displayed on screen) or multi-purpose buttons (e.g., a mobile phone may permit text entry using buttons that represent one or more letters, symbols or characters). In one embodiment, upon initial display of a search program application window 210, a search term input field 226 may include a default text entry that may or may not be associated with a certain category selection control. In one embodiment, the default text entry of a search term input field 226 may change in response to a selection of a search term selection control. For example, as set forth in the embodiment shown, a selection of a search category selection control 222 may result in the default text entry of "Search Health . . . " in a search term input field 226.

In another embodiment, upon initial display of a search program application window 210, a search term input field 226 may not include any text, may include a null value, or may include a flashing symbol such as a cursor. In one embodiment, a user may select a search category selection control 212, 214, 216, 218, 220, 222 and/or a search term input control 224 to launch a browser search associated with a selected category. For example, a user may launch a browser search by selecting one or more search category selection controls 212, 214, 216, 218, 220, 222 and then selecting a search term input control 224. As another example, by selecting a search category selection control 212, 214, 216, 218, 220, 222, a user may launch a browser directed to a search category web page or search category "front door" that is associated with the search category. In this example, a user selection of a search category selection control 212 may launch a browser directed to a "news" search category web page (e.g., http://news.yahoo.com) that is associated with the search category.

In another embodiment, a user may enter search terms into a search term input field 226 and select a search category selection control 212, 214, 216, 218, 220, 222 to launch a browser search associated with a selected category and entered search terms. For example, a user may enter "Lance Armstrong" (as described below in the text corresponding to FIG. 3) in a search term input field 226 and launch a browser search by selecting a search category selection control 218 corresponding to "Sports News."

In the embodiment shown, a search program application window 210 may also be comprised of search category selection controls 212, 214, 216, 218, 220, 222 that may be associated, respectively, with search addresses such as for the "U.S. News," "International News," "Entertainment News," "Sports News," "Business News," and "Health News" categories. One skilled in the art will recognize that greater or fewer search category selection controls may be provided within a search program application window 210. In one embodiment, a search category selection control 212, 214, 216, 218, 220, 222 may be selected by default. In the embodiment shown, a search category selection control 212, 214, 216, 218, 220, 222 may be comprised of selectable buttons. In another embodiment, a search category selection control 212, 214, 216, 218, 220, 222 may be comprised of one or more types of selection controls, including but not limited to check boxes and radio buttons. In the embodiment shown, a search category selection control 212, 214, 216, 218, 220, 222 may incorporate text to indicate a category. For example, a search category selection control 212 may display "U.S. News" to indicate a search category for searching United States news. In another embodiment, a search category selection control 212, 214, 216, 218, 220, 222 may incorporate an image, animation, and/or video to indicate a category. In the embodiment shown, a search category selection control 212, 214, 216, 218, 220, 222 may change appearance when selected. For example, as set forth in the embodiment shown, the border of a search category selection control 222 may be displayed using darker lines upon selection. One skilled in the art will recognize that the selection of a search category selection control 212, 214, 216, 218, 220, 222 may occur various ways, including but not limited to, pressing a button (e.g., using arrow keys to navigate between search category selection controls), pointing with a selection control (e.g., using a mouse to direct a pointer to a category selection control that is responsive to the pointer) or using another control (e.g., a search term input control 224). One skilled in the art will also recognize that the selection of a search category selection control 212, 214, 216, 218, 220, 222 may be indicated in various ways, including but not limited to visual and audible indications.

As set forth in the embodiment shown, a desktop 202 is also comprised of a browser program 204. One skilled in the art will recognize that a browser program 204 may take many forms. In one embodiment, a browser program 204 may display a search address 206 such as a URL and a viewing window 208. In the embodiment shown, at least a portion (e.g., "Health") of a search address 206 may correspond to a search address associated with selected search category selection control (e.g., a search category selection control 222).

Figure 3:
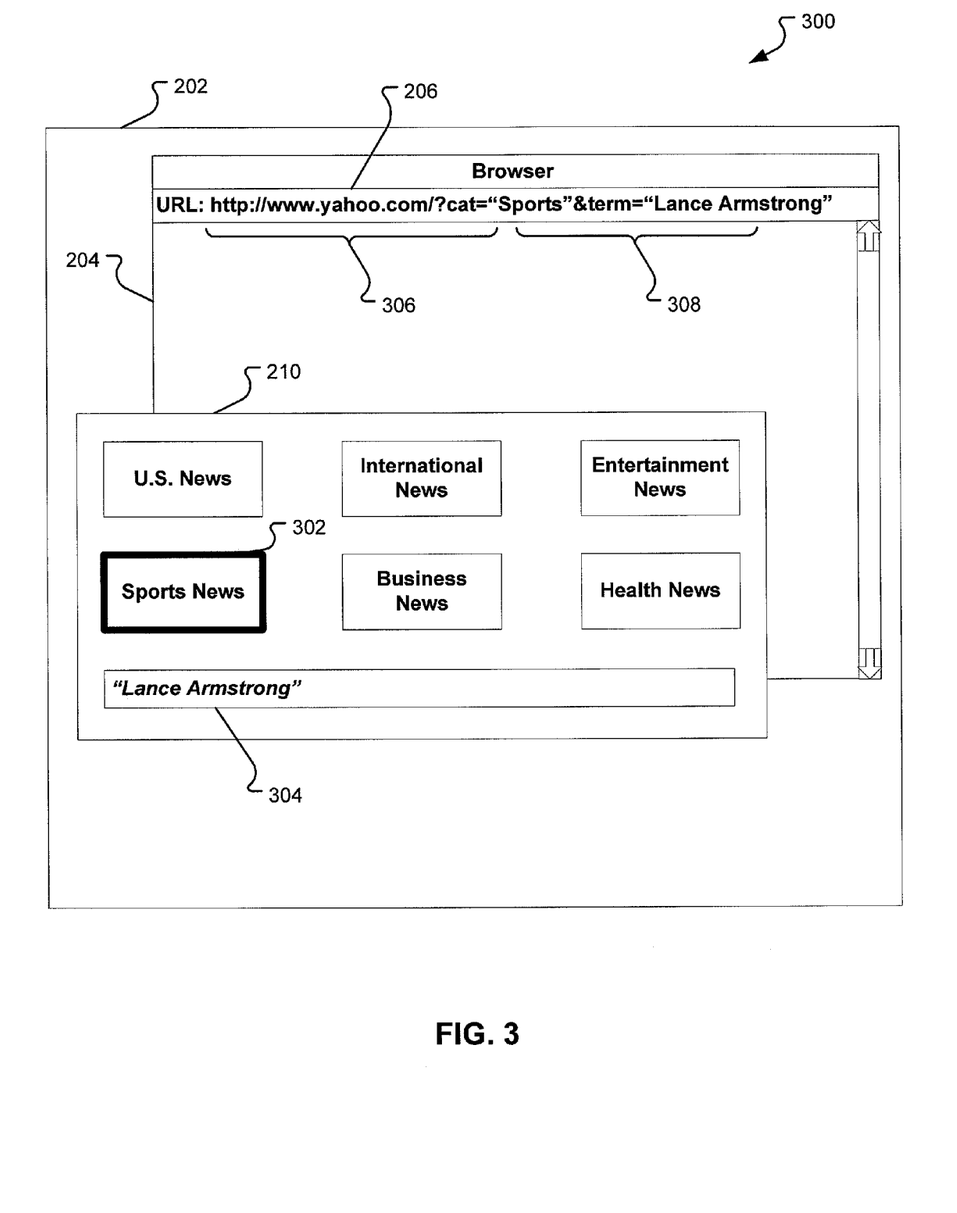
FIG. 3 illustrates an embodiment of a graphical user interface for searching in a networked computing environment.

FIG. 3 illustrates another embodiment of a GUI 300 for searching in a networked computing environment. As shown in this embodiment, a search program application window 210 may be comprised of a search term input field 304 including the search term "Lance Armstrong" and a selected search category selection control 302 may be associated with a "Sports" search category. In the embodiment shown, a user may launch a browser search by entering a search term (e.g., "Lance Armstrong") into a search term input field 304 and selecting a search category selection control 302. One skilled in the art will recognize that various ways of launching a browser search are possible and within the scope of this disclosure, including but not limited to input from a keyboard (e.g., a user may enter a search term into a search term input field 304 and then press an "Enter" key on a keyboard). In the embodiment shown, a search address 206 displayed in a browser program 204 may itself be modified such that a search address 306 associated with search category selection control 302 (e.g., http://www.yahoo.com/?cat="Sports") may be concatenated (e.g., using a "&" operator) with a search address 308 associated with a search term input field 304 (e.g., term="Lance Armstrong").

Figure 4:
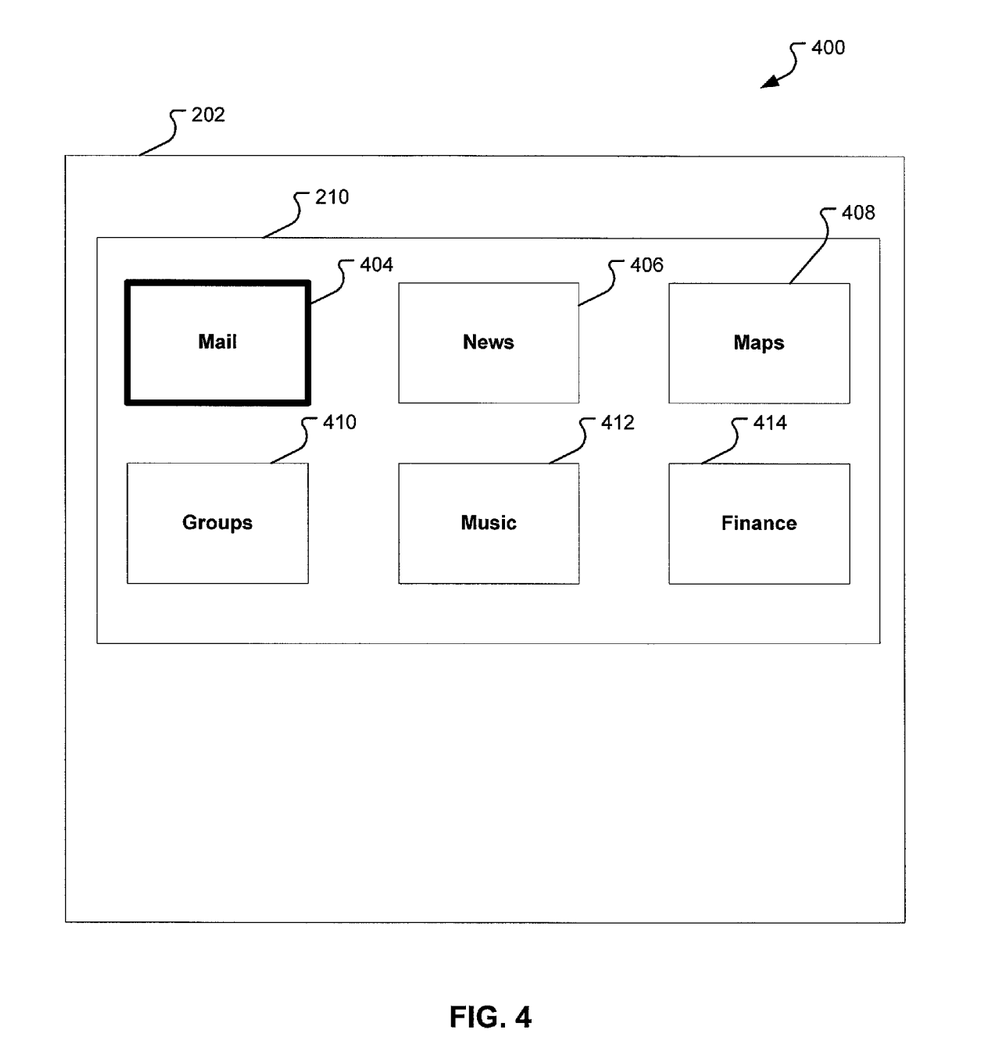
FIG. 4 illustrates an embodiment of a graphical user interface for searching in a networked computing environment.

FIG. 4 illustrates yet another embodiment of a GUI 400 for searching in a networked computing environment. As shown in this embodiment, a desktop 202 may be comprised of a search program application window 210 that does not necessarily incorporate a search term input field such as search term input field 226, 304 discussed above. As further shown in this embodiment, a search program application window 210 may be comprised solely of search category selection controls 404, 406, 408, 410, 412, 414. In the embodiment shown, search category selection controls 404, 406, 408, 410, 412, 414 may correspond solely to a parent or root search category (e.g., respectively, search category selection controls 404, 406, 408, 410, 412, 414 may correspond to "Mail," "News," "Maps," "Groups," "Music," and "Finance"). In the embodiment shown, selection of search category selection controls 404, 406, 408, 410, 412, 414 results in the launch of a browser to display a web page associated with the control. For example, selecting a search category selection control 404 may launch a browser to display a parent or root search page for searching a user's email. As another example, a selection of a search category selection control 412 may launch a browser directed to a "music" search category web page (e.g., http://music.yahoo.com) that is associated with the search category.

Figure 5:
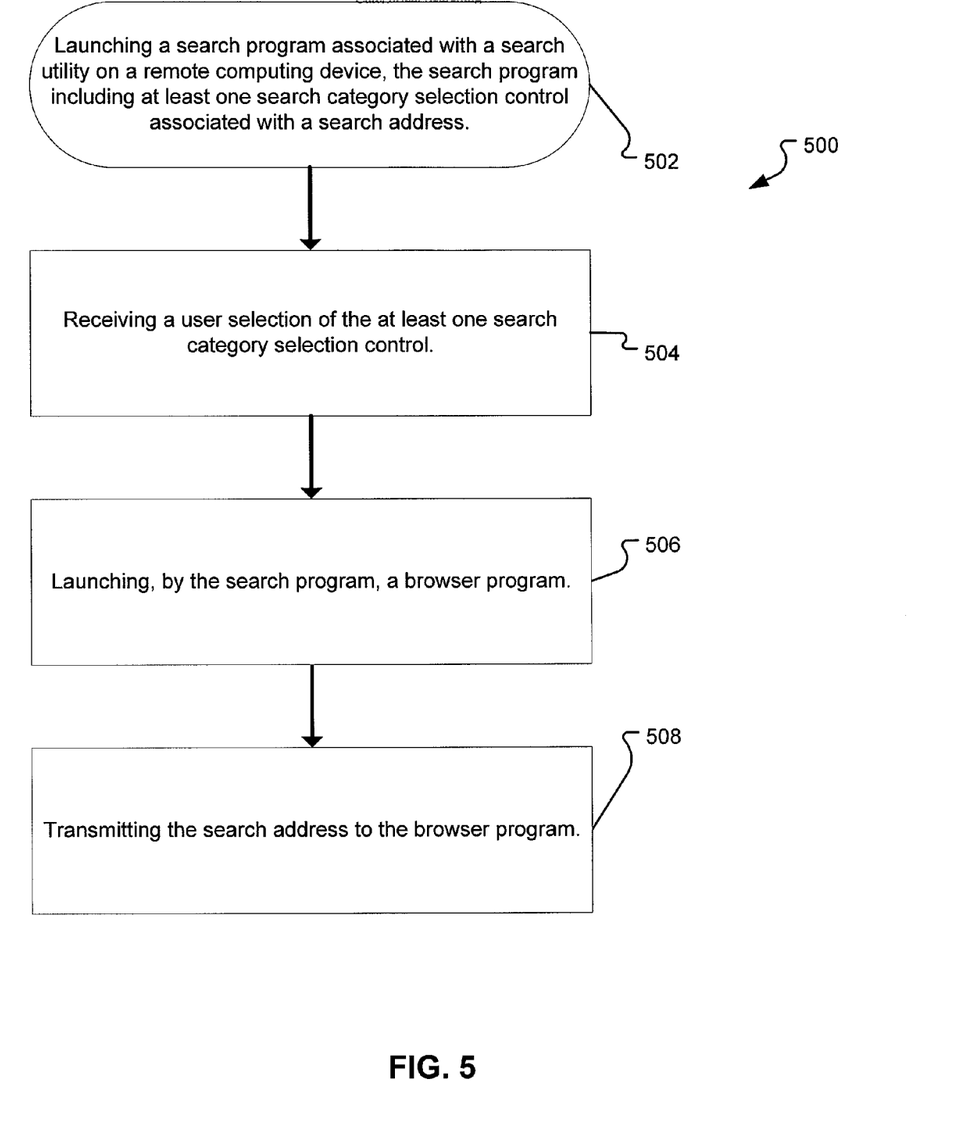
FIG. 5 illustrates an embodiment of a method for searching in a networked computing environment.

FIG. 5 illustrates an embodiment of a method 500 for searching in a networked computing environment. Method 500 includes a launch operation 502 that launches a search program associated with a search utility on a remote computing device, the search program including at least one search category selection control associated with a search address. In one embodiment, a launch operation 502 may comprise starting a search program by executing one or more computer-executable instructions on one or more computing devices. In another embodiment, a launch operation 502 may comprise switching to a search program that is already running on one or more computing devices. For example, a launch operation 502 may comprise "waking" a search program semaphore, halting a thread or using some other multi-processing or synchronization mechanism. The search program launched by a launch operation 502 may include one or more search category selection controls that are associated with search categories on a remote computing device. For example, search program may include "News" and "Sports" category selection controls that, respectively, correspond to "News" and "Sports" category identifiers of database records on a remote computing device. The search program launched by a launch operation 502 may also include one or more search category selection controls that are associated with a search address. In one embodiment, a search address is a URL. For example, a search category selection control may be associated with a search address that may be used by a browser to search a category associated with the category selection control. In another embodiment, a search address may be a portion of a URL. One skilled in the art will recognize that a search address may take many forms, including but not limited to a memory or hardware address of a computing device or component.

In the method 500, a user selection is then received of the at least one search category selection control in a receiving operation 504. In one embodiment, the user selection of a receiving operation 504 may include a user selection of a button, check box or radio button. In another embodiment, the user selection of a receiving operation 504 may include receiving user input from a keyboard or other input device. In one embodiment, the user selection of a receiving operation 504 may further include receiving a user input into a search term input field and modifying a search address based upon the user input. For example, a user may enter a text string into the search term input field that is then parsed for key terms that may be used to modify the search address associated with a selected search category selection control. One skilled in the art will recognize that the user selection of a receiving operation 504 may occur in many other ways that are also within the scope of this disclosure.

In the method 500, the search program then launches a browser program in a browser launch operation 506. In one embodiment, a browser launch operation 506 may comprise starting a browser program by executing one or more computer-executable instructions on one or more computing devices. In another embodiment, a browser launch operation 506 may comprise switching to a browser program that is already running on one or more computing devices. For example, a browser launch operation 506 may comprise "waking" a browser program semaphore, halting a thread or using some other multi-processing or synchronization mechanism.

In the embodiment shown, a method 500 further includes transmitting the search address to the browser program in a transmission operation 508. In one embodiment, a browser launch operation 506 and a transmission operation 508 may occur in parallel. For example, a launch operation 506 may launch a browser program using the search address as a command line argument when starting or switching to the browser program in a transmission operation 508. In another embodiment, a transmission operation 508 may comprise passing the search address as a memory reference or pointer to the browser program launched by a launch operation 506.

In a further embodiment (not shown), the browser program receiving a search address in a transmission operation 508 then transmits the search address to a search utility remote computing device. In one embodiment, the search utility at the remote computing device interprets the search address as a search request and thus parses one or more search categories and/or search terms from the search address in order to search an index with at least one record organized by category. In one embodiment, the search utility at the remote computing device then transmits search results corresponding to the search address to the browser program for display.

Figure 6:
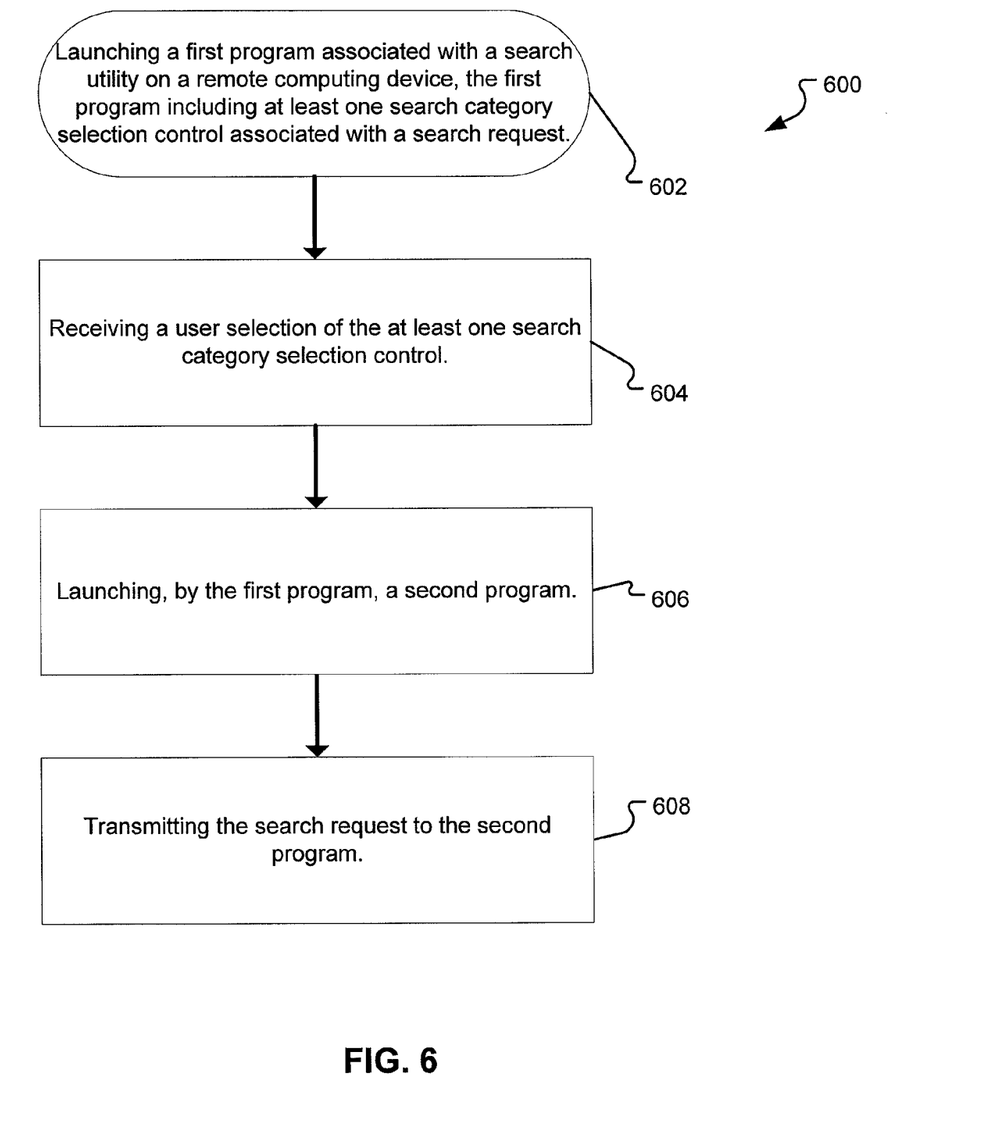
FIG. 6 illustrates another embodiment of a method for searching in a networked computing environment.

FIG. 6 illustrates an embodiment of another method 600 for searching in a networked computing environment. Method 600 includes a launching operation 602 whereby a first program associated with a search utility on a remote computing device is launched such that the first program includes at least one search category selection control associated with a search request. In one embodiment of launching operation 602, the first program further includes at least one search term input control. In a further embodiment of launching operation 602, a user input is received into the at least one search term input control and the search request is modified based on the user input. In another embodiment, modifying the search request based on the user input may incorporate at least a portion of the user input into the search request. In still yet another embodiment, modifying the search request based on the user input may involve parsing the user input. In another embodiment of launching operation 602, the at least one search category selection control may take the form of a button, a checkbox and/or a radio button. In yet another embodiment of launching operation 602, the search request may comprise a uniform resource locator for a web page associated with the at least one search category selection control.

Method 600 further includes a receiving operation 604 whereby a user selection of the at least one search category selection control is received. Method 600 additionally includes a launching operation 606 whereby a second program is launched by the first program. A second program may be a browser program, or the program associated with the first program (e.g., a child process of the first program). In one embodiment, the second program may include a display region associated with the second program. In another embodiment, the second program may utilize a display region that is associated with the first program.

In a transmission operation 608 of method 600, a search request is transmitted to the second program. In a further embodiment of method 600, launching operation 606 and transmission operation 608 may occur in parallel. In this embodiment, the launch of the second program may include transmission of a search address to the second program as a command line argument. In a further embodiment of method 600, the method 600 may further comprise transmission of a search request to the search utility. In still yet another embodiment of the method 600, the method 600 may further comprise receiving search results from the search utility. In still yet another embodiment of method 600, the method 600 may further comprise displaying the results to a user via the second program.

Figure 7:
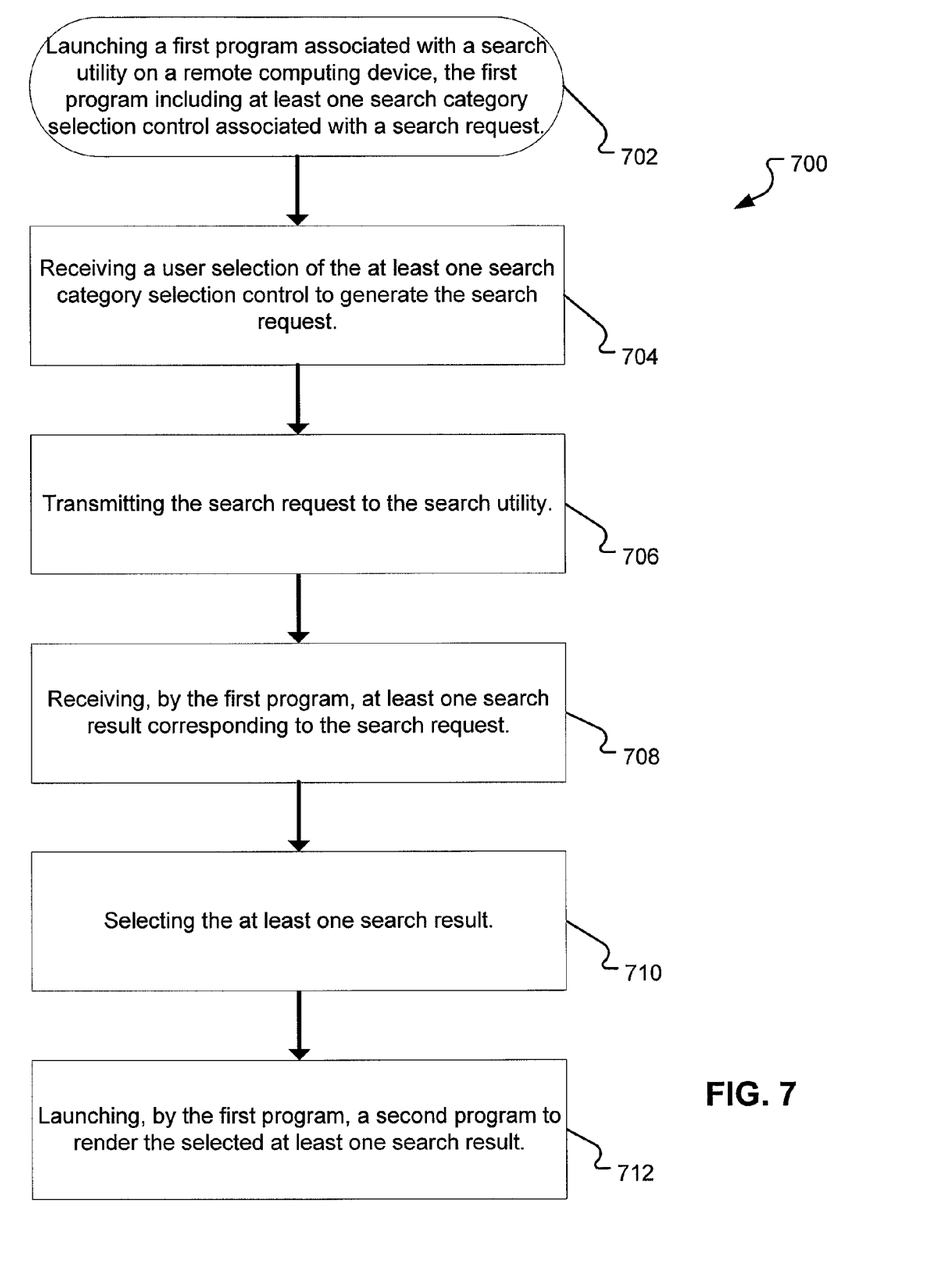
FIG. 7 illustrates yet another embodiment of a method for searching in a networked computing environment.

FIG. 7 illustrates an embodiment of yet another method 700 for searching in a networked computing environment. Method 700 includes a launching operation 702 whereby a first program associated with a search utility on a remote computing device is launched, such that the first program includes at least one search category selection control associated with a search request. In an embodiment, the at least one search category selection control is selected from a group consisting of a button, a check box, and a radio button. In one embodiment, the first program may further include at least one search term input control. In an embodiment, the search request may comprise a uniform resource locator for a web page associated with the at least one search category selection control. In receiving operation 704, a user selection of the at least one search category selection control to generate the search request is received. In transmitting operation 706 the search request is transmitted to the search utility. In receiving operation 708, at least one search result corresponding to the search request is received by the first program. In selecting operation 710, at least one search result is selected. In one embodiment, the selection of the at least one search result may comprise a user selection. For example, a user may be presented with one or more search results to select. In another embodiment, the selection of the at least one search result may comprise a selection by the first program. For example, the first program may automatically select a search result according to a predetermined algorithm (e.g., automatically pick the result with the highest relevance to the search request). In launching operation 712, a second program to render the selected at least one search result is launched by the first program. In one embodiment, the second program is a browser program. One skilled in the art will recognize that a second program may take other forms, including but not limited to a second program that interfaces with or controls one or more other programs.

In another embodiment of method 700, the method 700 may further comprise receiving a user input into a search term input control and modifying a search request based on the user input. In one embodiment, a search request may be modified such that the search request incorporates at least a portion of the user input. For example, modifying may involve parsing the user input.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, a selection of a search category selection control may launch a browser to display a web page specific to a certain user (e.g., a web page to search a user's email inbox). As another example, a selection of a search category selection control may launch a browser to display a web page for searching a file system (e.g., a web page to search a remote computing device). As yet another example, a selection of a search category selection control may launch a browser to display a web page for searching a plurality of related web pages (e.g., a web page to search web pages associated with a group of Internet users).

Those skilled in the art will further recognize that the various embodiments described for purposes of this disclosure may be alternatively embodied in a local computing environment. For example, a search utility may reside on a local computing device. As a further example, a transmission of a search request to the search utility may comprise transmitting one or more instructions to a local processing device associated with the search utility. One skilled in the art will additionally recognize that many configurations and embodiments for searching in a localized computing environment are possible and within the scope of this disclosure. Thus, the system elements corresponding to FIG. 1, as well as other methods appurtenant thereto, may reside in a local computing environment.

Numerous other changes may be made which will readily suggest themselves to those skilled in the art and which are encompassed in the spirit of the invention disclosed and as defined in the appended claims.

What is claimed is:

1. A method comprising the steps of:
launching, by a computing device, a search program consisting of a search term input field and a plurality of search category selection controls in communication with a search utility that is executing on a remote computing device, the search program displaying, in a window different from a browser window, the search term input field and the plurality of search category selection controls, each of the search category selection controls corresponding to a subject matter search category stored on an index;
receiving, via the search program by the computing device, user input in the search term input field and a user selection of one of the search category selection controls;
in response to receiving the user input and the user selection of the one of the search category selection controls, launching, by the search program, a browser program different from the search program; and
communicating to the browser program, by the search program, a search address comprising a Uniform Resource Locator comprising data indicative of the subject matter search category selected by the user and at least a portion of the user input, the communicating of the search address to the browser program so that the search utility can perform a search of the index in the subject matter search category and return a search result to the browser program.

2. The method of claim 1 wherein each of the search category selection controls is selected from a group consisting of a button, a check box, and a radio button.

3. The method of claim 1 wherein the search address comprises a uniform resource locator for a web page associated with the selected search category selection control.

4. The method of claim 1 wherein the steps of launching the browser program and communicating the search address to the browser program occur in parallel.

5. The method of claim 1 further comprising:
transmitting the search address to the search utility; and
receiving search results from the search utility.

6. The method of claim 5 further comprising:
displaying the search results to a user via the browser program.

7. The method of claim 1 wherein the search program further includes at least one search term input control.

8. The method of claim 7 further comprising:
receiving the user input into the search term input control; and
modifying the search address based on the user input.

9. The method of claim 8 wherein the modifying involves parsing the user input.

10. A system comprising:
a hardware processor;
a storage medium for tangibly storing thereon program logic for execution by the processor, the program logic comprising:
search logic executed by the processor for executing a search program consisting of a search term input field and a plurality of search category selection controls and adapted to permit selection of at least one of the plurality of search category selection controls corresponding to at least one of a plurality of subject matter search categories and to permit receipt of user input in the search term input field, the search program including instructions for generating and communicating a search module request to a browser program different from the search program, the search program displayed in a window different from a browser window and the search program displaying the search term input field and the plurality of search category selection controls;

browser logic executed by the processor for executing the browser program launched in response to selection of at least one of the search category selection controls and in response to the receipt of the user input in the search term input field, the browser program executing on the computing device and including instructions for receiving the search module request from the search program and transmitting a remote search module request to a search module executing on a remote computing device adapted to search, in response to receiving the remote search module request, for entries in a searchable index of entries that match the at least one search category, the search module request comprising a Uniform Resource Locator comprising data indicative of the subject matter search category and at least a portion of the user input, the receiving of the search address enabling the search module to perform a search of the index in the subject matter search category and return a search result to the browser program.

11. The system of claim 10 wherein the search module request includes information identifying the search module.

12. The system of claim 10 wherein the search module request and the remote search module request are identical.

13. The system of claim 10 further comprising:
a communication module adapted to communicate search results to the browser program.

14. The system of claim 10 wherein the search program is further adapted to permit input of a search term by a user.

15. The system of claim 14 wherein the search module request includes the search term input by the user.

16. A non-transitory computer readable storage medium comprising instructions executable by a computer for performing a method, the method comprising:
launching, by the computer, a search program consisting of a search term input field and a plurality of search category selection controls in communication with a search utility that is executing on a remote computing device, the search program displaying, in a window different from a browser window, the search term input field and the plurality of search category selection controls, each of the search category selection controls corresponding to a subject matter search category stored on an index;
receiving, via the search program by the computer, user input in the search term input field and a user selection of one of the search category selection controls;
in response to receiving the user input and the user selection of the one of the search category selection controls, launching, by the search program, a browser program different from the search program; and
communicating to the browser program, by the search program, a search address comprising a Uniform Resource Locator comprising data indicative of the search category selected by the user and at least a portion of the user input, the communicating of the search address to the browser program so that the search utility can perform a search of the index in the subject matter search category and return a search result to the browser program.

17. The non-transitory computer readable storage medium of claim 16 wherein each of the search category selection controls is selected from a group consisting of a button, a check box, and a radio button.

18. The non-transitory computer readable storage medium of claim 16 wherein the search address comprises a uniform resource locator for a web page associated with the selected search category selection control.

19. The non-transitory computer readable storage medium of claim 16 wherein the steps of launching the browser program and communicating the search address to the browser program occur in parallel.

20. The non-transitory computer readable storage medium of claim 16 further comprising instructions for:
transmitting the search address to the search utility; and
receiving search results from the search utility.

21. The non-transitory computer readable storage medium of claim 20 further comprising instructions for:
displaying the search results to a user via the browser program.

22. The non-transitory computer readable storage medium of claim 16 wherein the search program further includes at least one search term input control.

23. The non-transitory computer readable storage medium of claim 22 further comprising instructions for:
receiving the user input into the search term input control; and
modifying the search address based on the user input.

24. The non-transitory computer readable storage medium of claim 23 wherein the modifying involves parsing the user input.

25. A method comprising:
launching, by a computing device, a first program consisting of a search term input field and a plurality of search category selection controls in communication with a search utility that is executing on a remote computing device, the first program displaying, in a window different from a browser window, the search term input field and the plurality of search category selection controls, each of the search category selection controls corresponding to a subject matter search category stored on an index;
receiving, via the first program by the computing device, user input in the search term input field and a user selection of one of the search category selection controls to generate a search request comprising a Uniform Resource Locator comprising data indicative of the search category selected by the user and at least a portion of the user input;
communicating the search request to the search utility, the communicating of the search request to the search utility enabling the search utility to perform a search of the index in the subject matter search category;
receiving, by the first program, a search result corresponding to the search request and in the search category;
receiving a selection of the search result; and
in response to receiving the selection of the search result, launching, by the first program, a second program to render the selected search result, the second program different from the first program.

26. The method of claim 25 wherein the second program is a browser program.

27. The method of claim 25 wherein each of the search category selection controls is selected from a group consisting of a button, a check box, and a radio button.

28. The method of claim 25 wherein the search request comprises a uniform resource locator for a web page associated with the selected search category selection control.

29. The method of claim 25 wherein the receiving of the selection of the search result comprises receiving a user selection.

30. The method of claim 25 wherein the receiving of the selection of the search result comprises receiving a selection by the first program.

31. The method of claim 25 wherein the first program further includes at least one search term input control.

32. The method of claim 31 further comprising:
receiving the user input into the search term input control; and
modifying the search request based on the user input.

33. The method of claim 32 wherein the modifying involves parsing the user input.

34. A non-transitory computer readable storage medium comprising computer executable instructions for performing a method, the method comprising:
launching, by a computing device, a first program consisting of a search term input field and a plurality of search category selection controls in communication with a search utility that is executing on a remote computing device, the first program displaying, in a window different from a browser window, the search term input field and the plurality of search category selection controls, each of the search category selection controls corresponding to a subject matter search category stored on an index;
receiving, via the first program, user input in the search term input field and a user selection of the at least one search category selection control to generate a search request comprising a Uniform Resource Locator comprising data indicative of the search category selected by the user and at least a portion of the user input;
communicating the search request to the search utility, the communicating of the search request to the search utility enabling the search utility to perform a search of the index in the subject matter search category;
receiving, by the first program, a search result corresponding to the search request;
selecting the at least one search result; and
in response to receiving the selecting of the at least one search result, launching, by the first program, a second program to render the selected search result, the second program different from the first program.

35. The non-transitory computer readable storage medium of claim 34 wherein the second program is a browser program.

36. The non-transitory computer readable storage medium of claim 34 wherein each of the search category selection controls is selected from a group consisting of a button, a check box, and a radio button.

37. The non-transitory computer readable storage medium of claim 34 wherein the search request comprises a uniform resource locator for a web page associated with the selected search category selection control.

38. The non-transitory computer readable storage medium of claim 34 wherein the selection of the search result comprises a user selection of the search result.

39. The non-transitory computer readable storage medium of claim 34 wherein the selection of the search result comprises a selection of the search result by the first program.

40. The non-transitory computer readable storage medium of claim 34 wherein the first program further includes at least one search term input control.

41. The non-transitory computer readable storage medium of claim 40 further comprising instructions for:
receiving the user input into the search term input control; and
modifying the search request based on the user input.

42. The non-transitory computer readable storage medium of claim 41 wherein the modifying involves parsing the user input.

* * * * *